United States Patent Office 3,008,984
Patented Nov. 14, 1961

3,008,984
MANUFACTURE OF ACIDS FROM LIGNEOUS MATERIALS
Donald H. Grangaard, Appleton, Wis., assignor to Kimberly-Clark Corporation, Neenah, Wis., a corporation of Delaware
No Drawing. Filed Aug. 4, 1958, Ser. No. 753,151
4 Claims. (Cl. 260—527)

The present invention is concerned with a method for processing cellulosic material for the recovery of useful products. More particularly it is concerned with the processing of ligneous materials such as the ligneous wastes from cellulosic pulping operations for the production and recovery of organic acids.

In conventional processes for pulping woods there are produced vast quantities of waste materials. These waste materials usually include lignin, simple sugars resulting from the hydrolysis of cellulose and hemi-cellulose, and smaller proportions of inorganic salts and other waste materials. These solids are suspended or dissolved in the aqueous waste cooking liquor and in the case of sulfite liquors constitute about ten to twelve percent by weight of the liquor. About 2,500,000 tons of spent liquor solids from the sulfite pulping process alone, are produced annually in the United States.

The solids in the spent cooking liquors are in a form which is difficult to convert to useful products by conventional methods. Therefore the predominant part of the spent liquor solids produced in the United States is disposed of either by dumping the spent cooking liquor from sulfite pulping process into streams or by concentrating and burning the wastes from alkaline pulping process.

Both disposal methods result in the loss of substantial quantities of potentially valuable organic raw materials. The disposal of sulfite waste by dumping into streams, may, to some extent, deplete the available oxygen in the stream since part of the waste is in a form that readily takes up oxygen. The addition of solids to the stream may also tend to change the composition of the stream. On the other hand, the burning of the alkaline waste liquor, although it serves to produce heat as well as to recover the inorganic constituents, nevertheless constitutes a considerable loss of the potentially valuable organic materials. Further, it is not the most economical method of obtaining heat.

Various methods have been suggested to recover useful products from the ligneous and other wastes of pulping processes. Most of these recovery efforts have been based upon the physical properties of the waste liquor. For example, there has been some use of the waste liquors for soil modifiers, adhesives, emulsifying agents, roadbinders, tanning agents and the like. There have also been processes to produce heat or to obtain products such as vanillin, yeast, alcohol and improved tanning agents from waste liquor, by various reaction and extraction processes. In general, however, if the time of the reaction was short, the conditions of temperature, pressure, etc., were so severe that all carbon compounds present were substantially completely degraded. On the other hand, if less severe conditions of temperature, pressure, etc., were employed, complex organic molecules could be recovered, but the reaction times required to obtain useful products were long, and produced low over-all yields. The total recovery of useful products by all methods has been very small.

It is an object of the present invention to provide a method for the recovery of useful products from carbonaceous materials.

It is a further object to provide a continuous process for the production of organic acids from ligneous waste materials, and the recovery of said acids.

It is an additional object to provide a process for the production of organic acids from waste materials from cellulosic processes and the recovery of said acids.

Other objects of the present invention will be apparent from the detailed description which follows.

It has been discovered in accordance with the process of the present invention that ligneous materials can be converted into readily recoverable organic acids by a process of partial oxidation of the ligneous materials. Broadly, the process of the present invention comprises the treatment of a ligneous material, in an aqueous medium, at elevated temperatures, with a sulfur-containing reagent, under controlled conditions of hydrogen ion concentration, temperature and time. The ligneous materials are normally suspended or dissolved in an aqueous solution and processed at a concentration of ligneous solids of between about two and thirty percent by weight. The active oxidizing agent is sulfur which is substantially in the elemental state. The temperature of the reaction mixture is maintained between about 150 and 300° C. The reaction solution is maintained in the alkaline state throughout the reaction and the pH of the solution is preferably greater than about ten. The time of the reaction is related to the temperature and the concentration of the reactants and ordinarily is of the order of an hour or more. Among the organic acids produced by the process are acetic, formic, oxalic, fumaric, malonic, succinic, lactic, and other similar acids. These acids produced by the reaction of the process of the invention are readily recovered from the solution in accordance with the methods described in the present specification.

The process of the present invention is generally applicable to the processing of ligneous wastes produced in the pulping of wood. It may be applied to the processing of sulfite waste liquor, semi-chemical pulping waste liquors, and other waste liquors produced in wood pulping operations. The process may also be applied to relatively pure ligneous raw materials, for example, solutions of purified kraft lignin, Scholler lignin, etc. Other ligneous waste materials, for example, aqueous suspensions of comminuted wood such as sawdust and other finely granulated ligneous raw material may be processed by the present method. Fragments of ligneous material which have retained their fibrous character, such as wood chips, straw, bagasse, etc., can be treated by the process of the present invention to produce organic acids. The process may also be applied to other carbonaceous materials such as organic wastes, humic acids, phenolic wastes, sugar wastes, etc.

The solids to water ratio in the reaction solution may vary considerably. The total amount of dissolved and suspended solids is preferably maintained between about two and thirty percent by weight of the reaction solution. More dilute solutions can be processed by the present invention but it would be preferable to concentrate these solutions by evaporation prior to processing. More concentrated solutions of waste material can also be processed by the present method although the mechanical problems of handling such concentrated mixtures might make it desirable to dilute the mixtures to the preferred concentration range.

The reaction is carried out in the presence of an alkali capable of maintaining the hydrogen ion concentration of the reaction solution in the alkaline range throughout the entire reaction period. Sodium hydroxide is preferably used because of its availability and low cost. The amount of alkali added to the reaction should be at least sufficient to neutralize all the organic acids formed during the reaction together with the hydrogen sulfide and sulfurous acid. A substantial excess of the alkali may be added since a high initial alkali content is not harmful to the reaction and excellent yields of organic acids are obtained when the pH of the solution at the termination of the reaction is in the range of ten to fourteen.

The sufur may be incorporated into the solution as a suspension of finely divided elemental sulfur or as a polysulfide. The alkali polysulfides such as sodium polysulfide are particularly suitable. The polysulfides are decomposed by water with the establishment of equilibria between sulfur and lower sulfides. The sulfur in excess of the stoichiometric quantity present in the lowest sulfide is available to enter into the present reaction. The term "available sulfur" is used in the present application to indicate elemental sulfur and the sulfur in a polysulfide salt in excess of the stoichiometric amount present in the lowest sulfide form of the salt introduced into the reaction mixture. Available sulfur in an amount equivalent to fifty to two hundred percent of the weight of the ligneous solids is employed in the present process.

The reaction should be carried out between temperatures of approximately 150 and 300° C., in a suitable reaction vessel. The reaction is preferably carried out in a closed vessel under the pressure autogenically produced by the vapor pressure of the reaction solution. The reaction should be carried out for time sufficient to produce substantial quantities of the organic acids, and the time may vary depending upon the temperature, pressure, and concentrations of the reactants. The reaction, however, should be terminated before any substantial proportion of the organic acids formed are converted into carbon dioxide and water. Reaction times of the order of one-half to three hours have been used. Agitation of the reaction mixture during the reaction period is desirable.

Upon completion of the reaction period the reaction mixture is removed from the reaction vessel. The ligneous waste liquid undergoes substantial changes in color, clarity and viscosity during the reaction period. It there is any remaining oxidizable organic matter in the liquid after separation of the organic acids from the liquid, this material may be reprocessed until substantially all oxidizable matter has been removed. The resultant liquid after removal of the acids may be disposed of in streams.

The liquid which is obtained by carrying out the process of the present invention contains a substantial part of the original organic solids as organic acids particularly fumaric, acetic, formic, oxalic, malonic, succinic and lactic. These acids may be recovered from the resultant liquor by various methods. The liquor may be concentrated by evaporation, as a first step in the recovery process but this is not a necessary step and the liquor can be processed without such concentration. In one method of recovery, the liquor is acidified with a strong acid such as sulfuric to a pH of about two whereupon a slight precipitate may form. The amount of precipitate at this stage is dependent upon the conditions under which the reaction has been carried out. The precipitate, if one forms, is separated from the supernatant solution by filtration, or other conventional methods of separating solids from liquids. This precipitate, together with the other organic wastes from the various separation steps, can be recycled so that the present process contemplates the complete conversion of all organic material in ligneous wastes to organic acids or other usable by-products.

The supernatant solution obtained after separation of the precipitate may be extracted with an organic solvent such as ether to produce an organic extract. The ether extract on distillation to a ratio of distillate to residue of about two or two and one-half to one produces a distillate mixture of formic and acetic acids and a residue which is a mixture of higher molecular weight acids such as fumaric, succinic and lactic. The residue may be set aside for further processing by conventional methods of fractional distillation, solvent extraction or crystallization. The acetic and formic acids may be recovered separately from the distillate by conventional methods.

It has been found that the yield of acetic and formic acids from sulfite waste liquors may amount to a total of one hundred and fifty to three hundred pounds of acid per ton of pulp produced. Other fractions obtained in the foregoing processing method may also be treated to obtain additional organic acids. For example, extraction of the ether extract raffinate with n-butanol produces a butanol extract rich in the butanol esters of various organic acids.

The following examples are for the purpose of illustrating the present invention.

In each of the examples shown in Table I which follows, the ligneous material is ligneous wastes obtained by the sulfite process of pulping wood. In each of the examples two hundred parts by weight of sulfite spent pulping liquor containing approximately twenty parts by weight of ligneous solids was placed in the reaction vessel. The amount of sodium hydroxide and of sulfur or sulfur plus sodium sulfide indicated in Table I was then added to the reaction mixture. In Examples 4 and 5 the amount of sulfur shown in the table was dissolved in the amount of sodium sulfide shown in the table to form sodium polysulfide. The reaction vessel was then closed and the temperature of the reaction mixture brought up to the temperature range shown in Table I, and maintained for the period shown in Table I. The reaction solution was agitated during the reaction period. Upon completion of the reaction period the vessel was cooled, the contents acidified with hydrochloric acid, and the organic acids then separated from the resulting solution by an ether extraction.

*Table I*

| Example number | NaOH parts by weight | Sulfur parts by weight | Na$_2$S parts by weight | Time hrs. | Temp. ° C. | Amt. acids formed parts by weight |
|---|---|---|---|---|---|---|
| 1 | 60 | 20 | -------- | 1 | 250–280 | 12.052 |
| 2 | 60 | 20 | -------- | 1 | 250–280 | 7.406 |
| 3 | 60 | 10 | -------- | 1 | 250–280 | 8.740 |
| 4 | 50 | 20 | 50 | 1 | 160–170 | 12.328 |
| 5 | 50 | 30 | 50 | 1 | 160–170 | 13.156 |

The quantity of acid obtained was determined by titration and is expressed as parts of formic acid.

Individual acid fractions were then separated from the ether extract by distillations. Analysis of the acids obtained expressed in parts by weights, as shown in the Table I, is shown in Table II for Examples 1, 4 and 5 of Table I.

*Table II*

| Acids | Example No. | | |
|---|---|---|---|
| | 1 | 4 | 5 |
| | Parts by weight | Parts by weight | Parts by weight |
| Oxalic | 2.77 | 0.1 | 0.357 |
| Formic | 0.83 | 0.59 | 0.53 |
| Acetic | 0.81 | 0.68 | 0.42 |
| Lactic | 0.816 | (1) | 0.654 |
| Malonic | Trace | (1) | 0.123 |
| Succinic | 0.212 | (1) | 0.026 |
| Malic | Trace | (1) | Trace |
| Acid insoluble residue | 16.2 | 28.0 | 29.3 |

[1] Not determined quantitatively. Qualitative experiments indicate acid to be present.

It is apparent that numerous modifications can be made without departing from the scope of the present invention.

What is claimed is:

1. In a process for the partial oxidation of ligneous materials in aqueous wood pulping waste liquor to organic acids selected from the group consisting of fumaric, acetic, formic, oxalic, malonic, succinic, malic and lactic acids, the steps consisting essentially of adjusting said liquor with alkali to a pH of between about 10 and 14, adding sulfur in a substantially elemental form to the liquor in an amount of about 50 to 200 percent by weight of the ligneous solids present, then raising the temperature of the liquor to between about 150° to 300° C. while maintaining the liquor under autogenically produced pressure, agitating the liquor while maintained under said pressure and temperature to convert the ligneous materials into said organic acids, and thereafter recovering the resultant organic acids from the treated liquor.

2. The process of claim 1 in which the sulfur is added as an aqueous suspension of finely-divided sulfur.

3. The process of claim 1 in which the sulfur is dissolved in an aqueous solution of sodium sulfide before being added to the liquor.

4. In a process for treating aqueous wood pulping waste liquor to convert ligneous materials contained therein to organic acids selected from the group consisting of fumaric, acetic, formic, oxalic, malonic, succinic, malic and lactic acids, the steps consisting essentially of adjusting the liquor to a solids concentration within the range of about two to thirty percent, alkalizing the resultant solution to a pH of about 10 to 14, introducing sulfur in a substantially elemental form in an amount of about 50 to 200 percent by weight of the ligneous solids present, heating the liquor-sulfur mixture to between about 150°–300° C. under autogenically produced pressure conditions, maintaining said temperature and pressure conditions for a period of from about ½ hour to 3 hours to convert a substantial proportion of the ligneous material into said organic acids, and thereafter recovering said acids from the liquor.

References Cited in the file of this patent

UNITED STATES PATENTS 1,958,439   McKee _____ May 15, 1934

OTHER REFERENCES

Wise et al.: Wood Chem., vol. 2, 2nd ed. (1952), pp. 990, 996.